United States Patent Office 3,448,022
Patented June 3, 1969

3,448,022
ELECTROCHEMICAL ACYLOXYLATION OF OLEFINS
William J. Koehl, Jr., Yardley, Pa., assignor to Mobil Oil Corporation, a corporation of New York
No Drawing. Filed Dec. 28, 1966, Ser. No. 606,520
Int. Cl. C07c 45/02; B01k 1/00
U.S. Cl. 204—78                          11 Claims

ABSTRACT OF THE DISCLOSURE

A method for electrochemically preparing acyloxy derivatives of allylic compounds from olefins in the presence of a metal promoter. For example, aliphatic or cyclic olefins, in acetic acid and its alkali metal salt, are electrolyzed in the presence of cobalt acetate; the allylic hydrogen is replaced by the acetoxy group.

Background

The electrochemical acyloxylation of olefinic compounds was previously thought to be inherently non-selective, as is the acyloxylation of substituted benzenes as disclosed in copending application 399,370, filed Sep. 25, 1964 (now U.S. Patent No. 3,347,758). However, by the process of this invention the allylic hydrogen is selectively replaced by an acyloxy group. The electrochemical acyloxylation of substituted benzenes is disclosed in a concurrently filed application (Ser. No. 605,225) by the present applicant, entitled Process for Selective Acyloxylation. A non-electrochemical aceto-oxylation is disclosed in U.S. Patent 3,228,971.

The invention

This invention is directed to a method for the acyloxylation of olefins at their allylic hydrogens to produce the corresponding esters with a high degree of selectivity. This is accomplished by reacting the olefin and a compound comprising an acyloxy group in the presence of a metal compound promoter. The reaction mixture also contains an electrolyte and a solvent.

The allylic compounds useful in this invention may be depicted as follows:

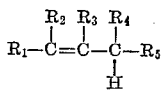

wherein $R_1$, $R_2$, $R_3$, $R_4$ and $R_5$ may be the same or different or may form a ring compound, and which do not interfere with the electrochemical reaction, these may be selected from the class consisting of hydrogen H—, alkyl R—, mononuclear aryl Ar—, alkoxy RO—, phenoxy PhO—, acyloxy R'COO—, halogen, such as chlorine, cyano NC—, carboxy R'OOC—, and acylamido R'CONH groups. R is a low molecular weight alkyl substituent having 1 to 12 carbon atoms, preferably up to 4 or 6 carbons, and comprising straight or branched chain radicals. The mononuclear aryl groups are radicals like phenyl. The R' radical may be alkyl, substituted alkyl, phenyl, or substituted phenyl, and the number of carbons in the alkyl or substituted alkyl groups may be as described above. In all of the foregoing substituents, the substituent itself may have a substituting group of the kind described, i.e., an alkyl, mononuclear aryl, alkoxy, phenoxy, aryloxy, or acylamido group.

Specific compounds that may be converted to acyloxy derivatives include propene, isobutene, 1-octene, and other straight and branched chain olefins having the formula $C_xH_{2x}$, wherein $x$ is from at least 3 to 20 and preferably 3 to 10. Where $R_1$ and $R_4$ form a ring compound, together they may be represented by the formula $-C_xH_{2x}-$, wherein $x$ is an integer from 1 to 5 and larger; a specific example is cyclohexene.

Other specific compounds that may be converted to acyloxy derivatives include allyl benzene, 1,1-diphenyl propene, allyl ethyl ether, allyl phenyl ether, allyl acetate, 4-chloro-1-butene, allyl cyanide, methyl α-crotonate and N-allyl-acetoamide. This listing is illustrative of compounds within the generic groupings given ahove. Of course, other suitable compounds include those similar to the specific compounds listed, for example, the $C_3$ olefinic substituents above may instead be $C_4$ to $C_8$ and larger olefinics, straight- or branch-chain.

The functions of solvent, electrolyte and acyloxy group may be obtained from one or more compounds. For example, a combination of an alkanoic acid and its alkali metal salt satisfies all three of the above functions in this invention. The alkanoic acid is a suitable solvent, its alkali metal salt is an electrolyte, and each may provide acyloxy groups for reaction with the benzylic compound.

Suitable alkanoic acids which function as a solvent for the other components of the solution and also for various products of electrolysis are the C=1 to C=10 acids, and preferably the C=2 to C=6 acids such as acetic, propionic, butanoic and pentanoic and their isomers, and the various hexanoic acids. Branched as well as straight chain acids are useful, including such acids as 2-methylbutyric, 3-methylbutyric, and tri-methylacetic. Other useful solvents are acetonitrile and dimethylformamide. In general any solvent or solvent mixture may be used which dissolves the reactants, and which of course does not itself interfere with the desired reaction. Although the alkanoic acids have a low degree of ionization they may also serve as a source of electrolyte by the addition of a base to form the corresponding salts. Alternatively, the alkali metal salt of the above used acid or another, which may serve as a reactant and electrolyte, can be separately added. The salt is usually the sodium or potassium salt, although lithium and quaternary ammonium salts are suitable.

The use of a minor porportion of water, 0.5 to 2% of the total charge, is suitable. However, this is not critical, since anhydrous solutions or substantial amounts of water may be used.

Any suitable inert cobalt salt may be used in this invention, and it may be added in the cobaltous or cobaltic state, the former being preferred because of its availability. The cobalt compound may be formed from any of the above alkanoic acids, the preferred promoter is cobalt acetate $Co(C_2H_3O_2)_2 \cdot 4H_2O$. Examples of inorganic cobalt salts are $Co(ClO_4)_2$ and $CoSO_4$. Other metals which may be chosen are those which undergo a one electron redox reaction at a potential of 1.0 to 2.0 volts such as cerium or manganese. These metals may also be used in the form of any soluble salt, inorganic or organic, such as the acetate, or from other alkanoic acids. The electrodes may be carbon or graphite, or formed from any inert metal such as copper, stainless steel, platinum, silver, nickel, lead, etc. The anode is preferably carbon, platinum or gold, whereas the cathode may be any of the above. Forms of the electrodes are conventional.

The composition range of the solution to be electrolyzed may vary widely, suitable ratios are solvent, 1:olefin, 0.05–1:alkanoic acid salt, 0.05–1:water, .005–.5: and promoter, 005–.5.

The current density may be maintained over a fairly wide range, say 0.001 to 1.0, and more preferably 0.01 to 0.26, amp./sq. cm. As is known, the current density value determines the rate of speed of the electrolysis.

Applied voltage is supplied by any suitable DC source.

Room temperatures are preferred, e.g., 20 to 40° C., although higher temperatures are useful, up to the boiling point of the solution. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, or neutral, but preferably is on the acid side, and suitably may range from a pH of 4 to 6, more broadly from 2 to 7.

The invention may be illustrated by the following examples.

Example 1.—Cyclohexene

A solution consisting of 120 ml. of acetic acid, 2.0 ml. of water, 20 g. of potassium acetate, 5.0 g. of cobalt acetate $(Co(C_2H_3O_2)_2 \cdot 4H_2O)$, and 20 ml. of cyclohexene was electrolyzed for 6 hours with 0.25 amp., 0.025 amp./cm.$^2$, at 6.6–6.9 v. and 32–33° C. The reaction mixture was diluted with water and extracted with ether. From the ether solution a product mixture was obtained which contained 91% of the allylic acetate, 3-acetoxycyclohexene, along with four unidentified minor products. The current efficiency for 3-acetoxycyclohexene formation was 59%. This high selectivity and current efficiency for 3-acetoxycyclohexene would be considerably less without the cobalt acetate.

Example 2.—1-octene

A solution consisting of 30 g. of 1-octene and the materials of Example 1 (except cyclohexene) was electrolyzed for 11¼ hrs. with 0.25 amp. at 6.6–6.7 v. and 31–32°. The reaction mixture was diluted with water and extracted with ether. The extract was concentrated to 4.1 g. of a mixture comprising 59% 1-octene, 15% and 21% of isomeric monoacetates and 5 minor products. The current efficiency for the pair of monoacetates was 33%. The monoacetates were isolated and shown by IR and NMR to be 3-acetoxy-1-octene and 1-acetoxy-2-octene, respectively.

Example 3.—Isobutene

Isobutene was bubbled at a rate of 10 to 20 cc./min. through a solution of 10 g. of cobalt acetate, 25 g. of potassium acetate, and 2 ml. of water in 140 ml. of acetic acid while electrolysis was conducted for 8 hrs. at 7.3–7.5 v., 0.40 amp., 33–35° C. The reaction mixture was diluted with water and extracted with ether. From the ether extract 2-methylallyl acetate was distilled. It was identified by its IR and NMR spectra. The current efficiency for its formation was 19%.

Example 4.—Propene

Propene was reacted under the conditions set forth in Example 3. Allyl acetate was produced. It was identified by gas chromatography and its current efficiency estimated as 4%.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

In light of the foregoing description, the following is claimed.

1. A method which comprises electrolyzing a solution comprising an electrolyte, a solvent, a promoter selected from metal compounds which undergo a one electron redox reaction at a potential of 1.0 to 2.0 volts, and a substituted allylic compound of the following formula:

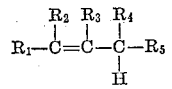

wherein $R_1$, $R_2$, $R_3$, $R_4$ and $R_5$ are independently selected from the class consisting of hydrogen H—, alkyl R—, mononuclear aryl Ar—, alkoxy RO—, phenoxy PhO—, acyloxy R'COO—, halogen, cyano NC—, carboxy R'OOC—, and acylamido R'CONH groups, wherein R is a low molecular weight alkyl substituent having 1 to 12 carbon atoms and wherein R' is selected from the group consisting of alkyl, substituted alkyl, phenyl or substituted phenyl.

2. The process of claim 1 wherein said promoter is a cobalt compound of an alkanoic acid.

3. The process of claim 1 wherein said solvent is an alkanoic acid having 1 to 10 carbon atoms.

4. The process of claim 3 wherein said alkanoic acid is acetic acid.

5. The process of claim 1 wherein said electrolyte is an alkali metal salt of an alkanoic acid having 1 to 10 carbon atoms.

6. The process of claim 5 wherein said electrolyte is an alkali metal salt of acetic acid.

7. The process of claim 1 wherein said solution contains 0.5 to 2% water.

8. The process of claim 1 wherein the solution includes the following ratios of compounds: solvent, 1:olefin, 0.05–1:electrolyte 0.05–1:water 0.005–.5: and promoter 0.005–.5.

9. The process of claim 1 wherein the electrolysis is carried out with a current density of 0.001 to 1.0 amp./sq. cm.

10. The process of claim 1 wherein $R_1$ and $R_4$ comprise an alkylene group of the following formula

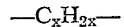

wherein $x$ is an integer from 1 to 5.

11. The process of claim 1 wherein the substituted allylic compound has the following formula:

wherein $x$ is an integer from 3 to 20.

References Cited

UNITED STATES PATENTS

| | | | |
|---|---|---|---|
| 3,252,876 | 5/1966 | Koehl | 204—59 |
| 3,252,878 | 5/1966 | Koehl | 204—59 |
| 3,397,226 | 8/1968 | Fenton | 204—78 |

JOHN H. MACK, *Primary Examiner.*

H. M. FLOURNOY, *Assistant Examiner.*